US009056722B2

(12) United States Patent
Otto

(10) Patent No.: US 9,056,722 B2
(45) Date of Patent: Jun. 16, 2015

(54) THRUST CHAIN LINK OF A CONVEYOR CHAIN, CONVEYOR CHAIN, CONVEYOR SYSTEM AND METHOD FOR POSITIONING A RETAINING ADAPTER ON A CONVEYOR CHAIN

(71) Applicant: Thomas Otto, Bielefeld (DE)

(72) Inventor: Thomas Otto, Bielefeld (DE)

(73) Assignee: SDI GROUP GERMANY MATERIAL HANDLING SOLUTIONS GMBH, Bielefeld (DE)

( * ) Notice: Subject to any disclaimer, the term of this patent is extended or adjusted under 35 U.S.C. 154(b) by 9 days.

(21) Appl. No.: 14/103,361

(22) Filed: Dec. 11, 2013

(65) Prior Publication Data

US 2014/0374219 A1    Dec. 25, 2014

(30) Foreign Application Priority Data

Jun. 24, 2013 (EP) .................................... 13173419

(51) Int. Cl.
| | | |
|---|---|---|
| *B65G 17/32* | (2006.01) | |
| *B65G 15/48* | (2006.01) | |
| *B61B 10/02* | (2006.01) | |
| *B65G 19/02* | (2006.01) | |
| *B65G 19/20* | (2006.01) | |
| *B65G 19/22* | (2006.01) | |

(52) U.S. Cl.
CPC .............. *B65G 15/48* (2013.01); *B61B 10/025* (2013.01); *B65G 19/025* (2013.01); *B65G 19/205* (2013.01); *B65G 19/225* (2013.01)

(58) Field of Classification Search
CPC .... B65G 19/025; B65G 9/002; B65G 17/485; B65G 1/0457; B65G 17/20
USPC ............ 198/687, 834, 678.1, 680, 687.1, 850
See application file for complete search history.

(56) References Cited

U.S. PATENT DOCUMENTS

| | | | | |
|---|---|---|---|---|
| 6,609,608 | B2 * | 8/2003 | Schneuing | ................. 198/465.4 |
| 8,561,787 | B2 * | 10/2013 | Wend et al. | .................... 198/687 |
| 2003/0081926 | A1 * | 5/2003 | Jeong et al. | .................... 385/137 |
| 2008/0053795 | A1 * | 3/2008 | Santicchi | ................... 198/678.1 |
| 2011/0114452 | A1 * | 5/2011 | Zoppas et al. | ............. 198/678.1 |
| 2012/0193192 | A1 | 8/2012 | Winkler | |

FOREIGN PATENT DOCUMENTS

DE       102010053426       6/2012

* cited by examiner

*Primary Examiner* — James R Bidwell
(74) *Attorney, Agent, or Firm* — Stefan Knirr

(57) ABSTRACT

A thrust chain link of a conveyor chain of a conveyor system for conveying articles suspended from retaining adapters, in particular of a sorter, includes a base body with a thrust unit arranged on its bottom side and spaced-apart coupling sections formed on its ends for pivotal connection to an adjacent link. The thrust unit includes two tappets protruding from the bottom side of the base body, wherein a front first tappet in the conveying direction is shorter than a rear second tappet. The two tappets are spaced apart such that a head portion of the retaining adapter can be received between the two tappets without play or largely without play. A conveyor chain, a conveyor system and a method for positioning a retaining adapter on a conveyor chain of a conveyor system are also described.

10 Claims, 5 Drawing Sheets

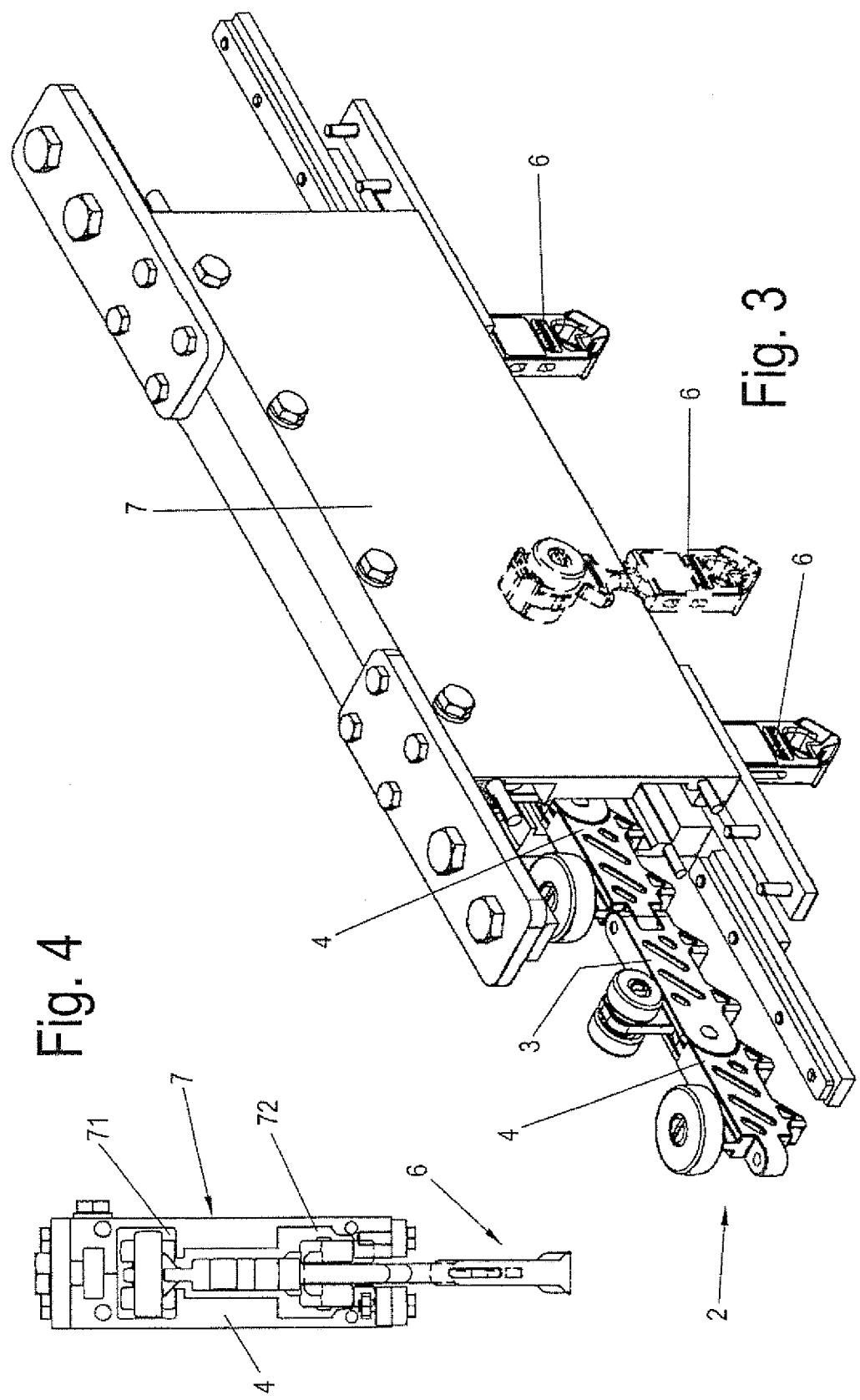

THRUST CHAIN LINK OF A CONVEYOR CHAIN, CONVEYOR CHAIN, CONVEYOR SYSTEM AND METHOD FOR POSITIONING A RETAINING ADAPTER ON A CONVEYOR CHAIN

CROSS-REFERENCES TO RELATED APPLICATIONS

This application claims the priority of European Patent Application, Serial No. 13 173 419.6, filed Jun. 24, 2013, pursuant to 35 U.S.C. 119(a)-(d), the content of which is incorporated herein by reference in its entirety as if fully set forth herein.

BACKGROUND OF THE INVENTION

The present invention relates to a thrust chain link of a conveyor chain of a conveyor system for conveying articles suspended from retaining adapters, to a conveyor chain, to a conveyor system as well as to a method for positioning a retaining adapter on a conveyor chain.

The following discussion of related art is provided to assist the reader in understanding the advantages of the invention, and is not to be construed as an admission that this related art is prior art to this invention.

Conveyor systems are used for conveying suspended objects and may include a conveyor chain composed of chain links, which is driven by friction rollers. Some conveyor systems also have thrust elements with carrier bars oriented perpendicularly to the conveying direction project vertically downwards on the bottom each of the chain links, wherein retaining adapters or items suspended from these retaining adapters, for example garments such as shirts or jackets or bags, are moved by the carrier bars in the conveying direction.

In particular in a conveyor system formed as a so-called "sorter", it is important to accurately know the position of the retaining adapters and thus the position of the articles to be conveyed and to maintain a predetermined distance between the retaining adapters, so that individual retaining adapters and articles suspended from the individual retaining adapters can be sorted from one region of the conveyor system to another area of the conveyor system via a switch, as needed.

This can be accomplished, for example, by using synchronizing units which engage positively in the chain links and hence match the respective speed of a discharge-/ or feeding station with the speed of the conveyor chain.

It would therefore be desirable and advantageous to obviate prior art shortcomings and to provide an improved thrust chain link of a conveyor chain of a conveyor system, a conveyor chain as well as a conveyor system and a method for positioning a retaining adapter on a conveyor chain which further simplifies the transfer of a retaining adapter and hence also of the article transported with the retaining adapter at a predetermined position of the conveyor chain.

SUMMARY OF THE INVENTION

According to one aspect of the present invention, a thrust chain link of a conveyor chain of a conveyor system for conveying articles suspended from retaining adapters includes a base body having a thrust unit arranged on a bottom side of the base body and coupling sections formed on ends of the base body that are spaced-apart in a conveying direction for pivotal connection of the base body to an adjacent chain link. The thrust unit includes two tappets protruding from the bottom side of the base body, with a front first tappet in the conveying direction being shorter than a rear second tappet. The two tappets are spaced apart such that a head portion of a retaining adapter is received between the two tappets without play or largely without play.

Because the tappets have different lengths, one retaining adapter, which is guided in a second track of the rail profile section of a conveyor system, can be slightly lowered to pass underneath the front shorter tappet and is only retained by the longer rear tappet. When the second track subsequently rises again, the head of the retaining adapter moves upwardly between the two tappets such that the retaining adapter maintains its position between the two tappets even when the conveyor chain slows down or stops.

According to another aspect of the invention, a conveyor chain of a conveyor system for conveying articles suspended from retaining adapters includes several chain links having each a base body, wherein coupling sections for pivotal connection of adjacent chain links are provided on ends of the base body that are spaced apart in the conveying direction. A portion of the chain links is formed as thrust chain links in the aforedescribed manner, with at least one chain link formed as a connection chain link and arranged between two thrust chain links.

According to another aspect of the invention, a conveyor system for conveying suspended articles includes a rail profile, a conveyor chain movable in a first track of the rail profile in a conveying direction and having a plurality of chain links, and retaining adapter for retaining each a respective article to be conveyed. Each of the chain links has a base body with a thrust unit arranged on its bottom side. The retaining adapters each have a head portion that is rollably supported in a second track of the rail profile. The rail profile has a coupling section in which the retaining adapters can be coupled between tappets of the thrust chain links, wherein the coupling section of the rail profile is formed in the second track as a localized depression relative to a main displacement plane, and a local low point in the depression is dimensioned relative to the main displacement plane so that the front first tappet of the thrust chain link in this region is out of engagement with the head part of the retaining adapter. This guarantees reliable insertion of the head portions of the retaining adapter between the tappets of the thrust links of the thrust unit.

The conveyor system configured in this manner enables reliable spacing and transport of the suspended articles in a simple manner.

According to another aspect of the invention, a method for positioning a retaining adapter on a conveyor chain includes the steps of:

a. Inserting the adapter into a section of the conveyor chain between a second tappet of a first thrust chain link in a forward conveying direction and a first tappet of a rear thrust chain link in the conveying direction, b. Carrying along the retaining adapters in the conveying direction into a coupling section of the rail profile by a first tappet of the rear thrust chain link in the conveying direction, with the first tappet being arranged before the second tappet in the conveying direction, c. Lowering the retaining adapter underneath the first tappet and advancing the retaining adapter in the conveying direction with the second tappet in the coupling section of the rail profile, d. Raising the retaining adapter between the first tappet and the second tappet of the conveyor chain in the coupling section of the rail profile.

This allows the retaining adapter to be reliably positioned at a predetermined position of the conveyor chain.

According to an advantageous feature of the present invention, the tappets may be formed as bars that protrude vertically from the bottom side of the base body and are configured to capture the head portion of the retaining adapters. Such bars can be easily and inexpensively manufactured by forming them on the base body of the thrust chain link.

According to another advantageous feature of the present invention, at least one of the tappets, in particular the second longer tappet, may be formed with a T-shape, wherein a throat portion of the T-shaped tappet extends from the bottom side of the base body. A cross-piece of the T-shaped tappet oriented perpendicular to the throat portion may then be formed on an end of the throat portion facing away from the bottom side of the base body, wherein the cross-piece is aligned perpendicular to the longitudinal axis of the base body. The T-shaped design of the, in particular, longer rear tappet provides a wider abutment surface for the head portion of the respective retaining adapter.

According to another advantageous feature of the present invention, the spacing between two tappets of thrust chain links connected with one another by connection chain links may be between 200 mm and 300 mm, thus allowing a high placement density of the conveyor chain with retaining adapters and/or the articles to be transported thereon.

According to another advantageous feature of the present invention, the base body of the thrust chain links and the connection chain links may include lateral friction roller pressing faces against which the friction rollers driving the conveyor chain can be pressed, as well as a bearing disposed on an upper surface of the base body for supporting running or guide rollers. The friction roller drive enables a particularly low-wear and low-noise drive the conveyor chain.

According to another advantageous feature of the present invention, the coupling section of the rail profile may be formed as a localized depression in relation to a displacement plane in the second track, wherein a local low point in the depression of the second track relative to the main displacement plane is dimensioned such that in this region the front first tappet of the thrust chain link is out of engagement with the head portion of the retaining adapter.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a perspective of a detail of a coupling section of a conveyor system showing a rail profile, and a conveyor chain and retaining adapter moving therein, FIG. 4 shows a sectional view perpendicular to the conveying direction of the conveyor system of FIG. 3.

DETAILED DESCRIPTION OF PREFERRED EMBODIMENTS

Figure 1:
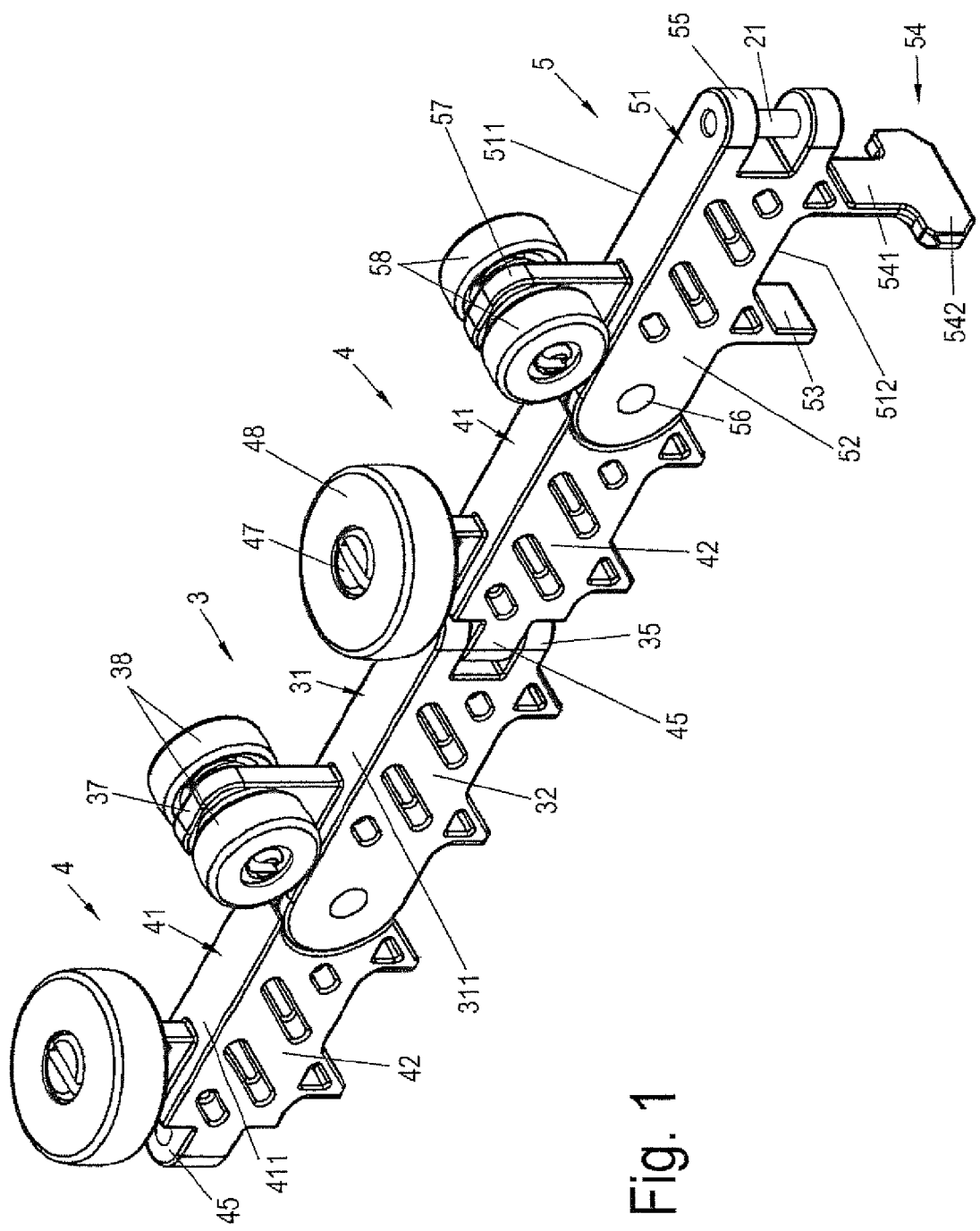
FIG. 1 shows a perspective view of an embodiment of a thrust chain link according to the present invention with connecting links coupled thereto.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the following description, terminology such as top, bottom, left, right, front, rear, etc. refers exclusively to the respective exemplary representation and position of the thrust link, retaining adapters, conveyor chain, conveyor and other parts selected in the Figures. These terms are not meant to be limiting, i.e. these references may change due to various working positions or a mirror-symmetrical design or the like.

Turning now to the drawing, and in particular to FIGS. 1 to 6, there is shown a conveyor chain of a conveyor system, designated by the reference numeral 2, wherein the conveyor chain is composed of a plurality of chain links 3, 4, 5, which are pivotally connected to one another and which are guided in a first, upper track 71 of a the rail profile 7 of the conveyor system.

Figure 5:
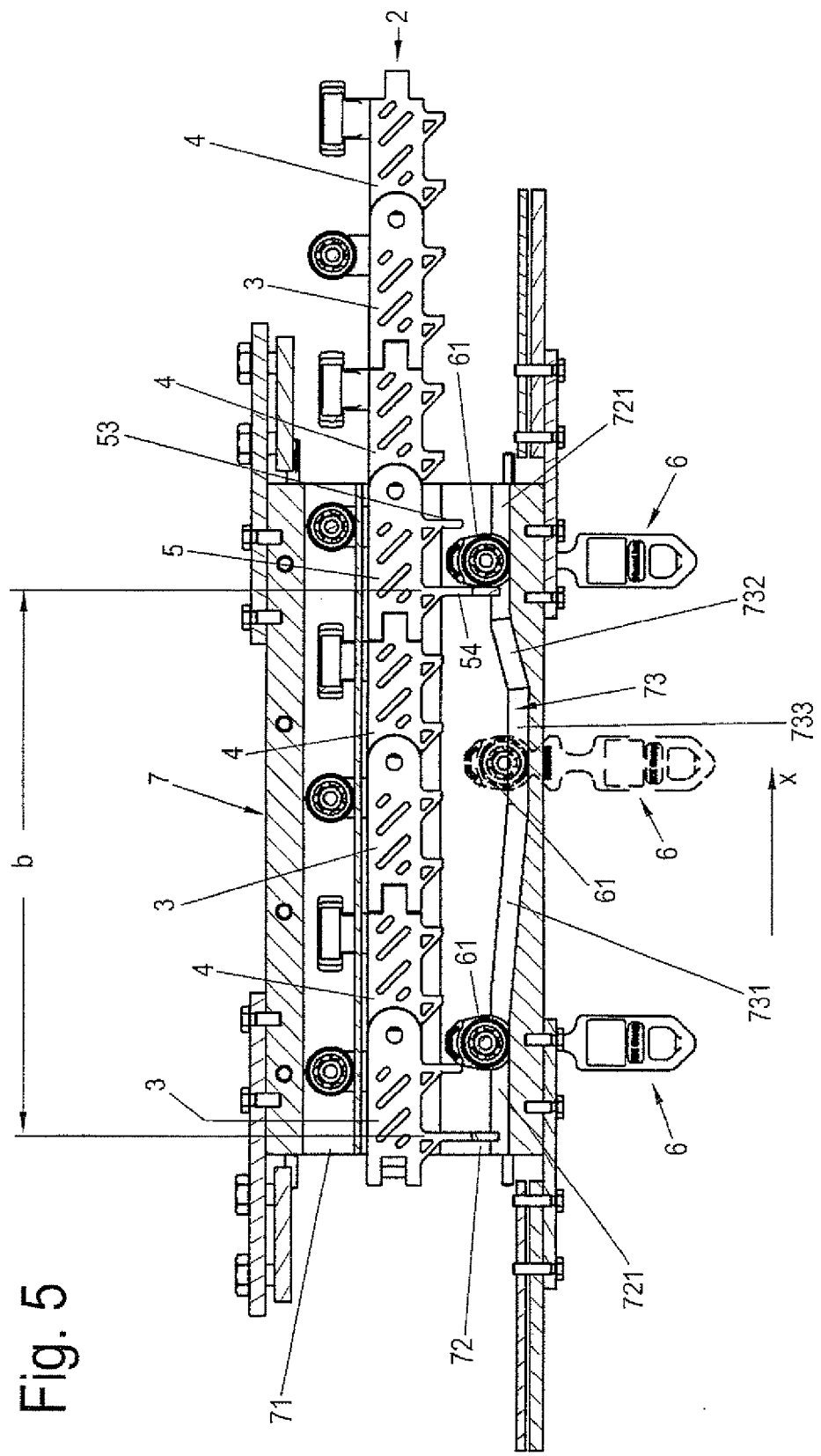
FIG. 5 shows a side view of the detail of the conveyor system of FIG. 3 without a side cover.

Each of the chain links 3, 4, 5 has a base body 31, 41, 51 with lateral pressure roller pressing faces 32, 42, 52, against which (unillustrated) friction rollers can be pressed against the conveyor chain 2 for driving the conveyor chain 2 in a conveying direction x in the rail profile 7. Bearings 37, 47, 57 for supporting track or guide rollers 38, 48, 58 are provided on the top side 311, 411, 511 of the base body 31, 41, 51 so as to guide the chain links 3, 4, 5 in the first track 71 of the rail profile 7, as shown in FIGS. 3 to 5. The guide rollers 48 are preferably rotatable about a vertical axis, whereas the track rollers 38, 58 are preferably arranged in pairs on both sides of the bearing 37, 57 and run on a running surface the track 72 of the rail profile 7 in the conveying direction x.

Figure 2:
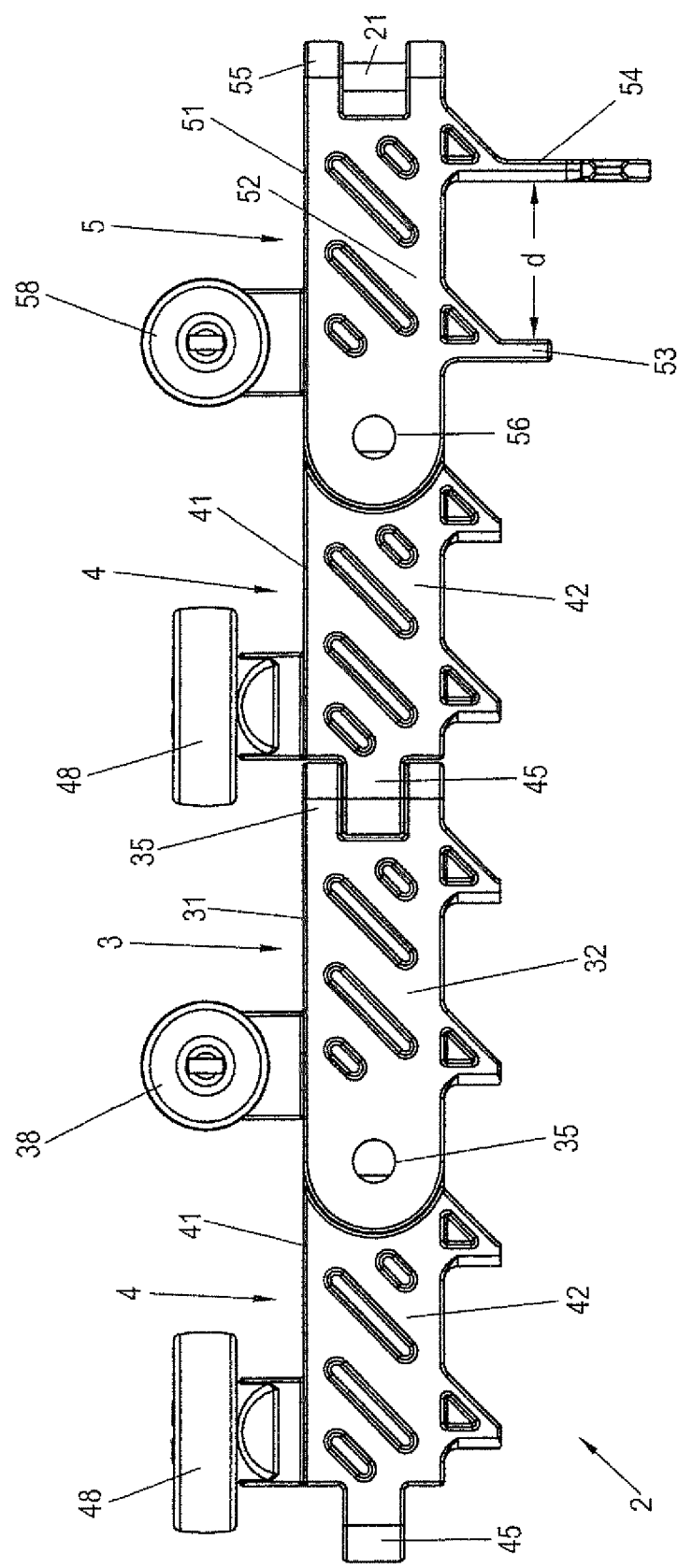
FIG. 2 shows a side view of the detail of a conveyor chain of FIG. 1.

As shown in FIGS. 1 and 2, the conveyor chain 2 is composed, on one hand, of chain links formed as thrust chain links 5 and, on the other hand, of chain links formed of connection chain links 3, 4.

Conversely, the connection chain links 3, 4 of the bottom side 312, 412 of the respective base body 31, 41 are flat or are provided with short bars, as shown in FIGS. 1 and 2, whose vertical downward extent is dimensioned so that movable retaining adapter 6 formed in a second track 72 underneath the first track 71 do not come into contact with these short bars during operation, so that the retaining adapters are not displaced by the connection chain links 3, 4.

However, the thrust chain links 5 are characterized by two tappets 53, 54 protruding from the bottom side 512 of the base body 51, wherein a first front tappet 53 in the conveying direction x is shorter in a downward direction toward the second track 72 and/or in the direction of the retaining adapters 6 guided in the second track 72 than a second rear tappet 54.

The spacing d between the two tappets 53, 54 is dimensioned so that a head portion 61 of the retaining adapter 6 can be accommodated between the two tappets 53, 54 without play or substantially without play.

These tappets 53, 54 projecting downwardly from the base body 51, which are formed preferably as bars projecting perpendicular from the bottom surface 512 of the base member 51, have a length so that the retaining adapter 6 is captured by the tappets 53, 54 and moved in the conveying direction, after a retaining adapter 6 is inserted in the region of the conveyor system in which the conveyor chain 2 equipped with the thrust chain links 5 runs.

The method for positioning the retaining adapter 6 in the above-described chain conveyor 2, i.e. the insertion of the retaining adapter 6 in the region of the conveyor system in which conveyor chain 2 equipped with the thrust chain links 5 is running, will now be described with reference to FIGS. 5 and 6.

Figure 6:
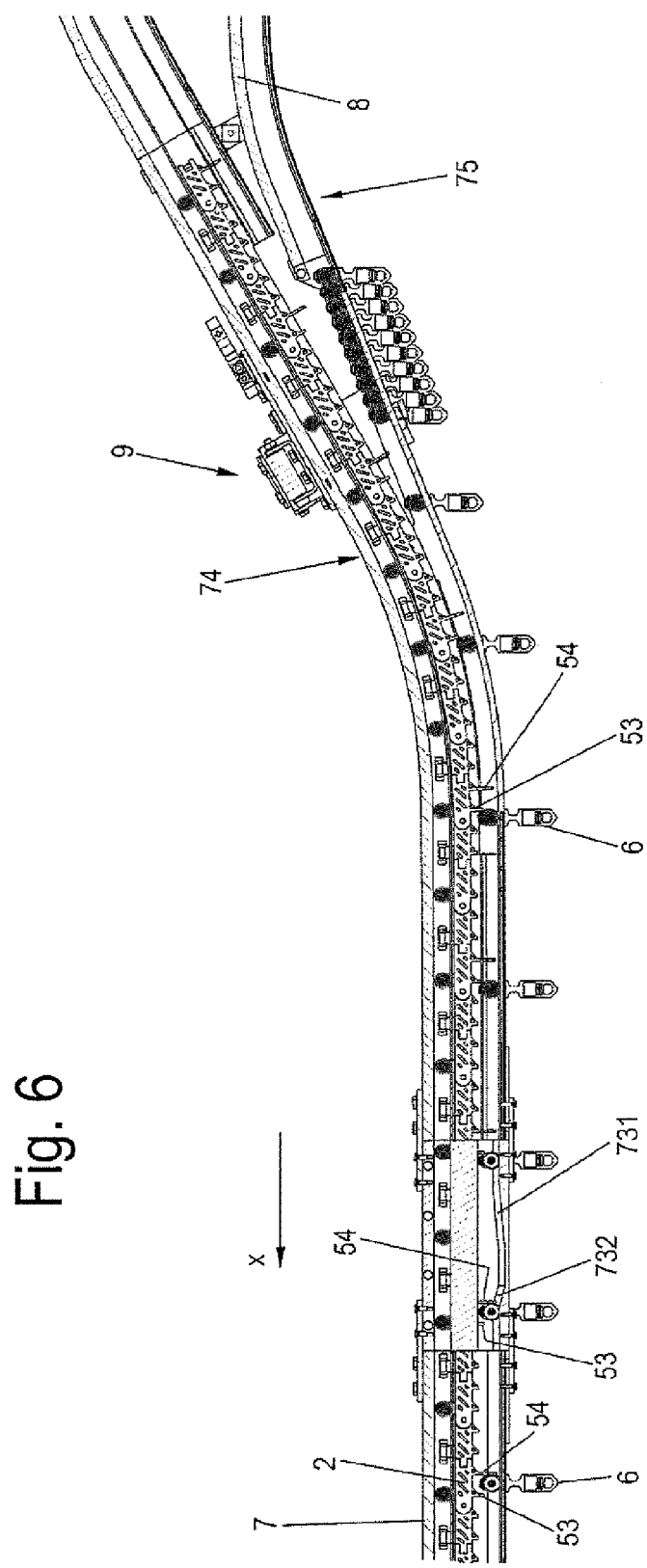
FIG. 6 shows a side view of a detail of the conveyor system with integrated coupling section showing the coupling of the retaining adapter between the tappets of the conveyor chain.

First, as shown in FIG. 6, the retaining adapter 6 which arrives from another rail profile 8 that opens into a switch 75 of the rail profile 7 is inserted in the rail section 7, preferably in the region of downhill section 74 of the rail section 7. A separating device 9, where the retaining adapters 6 arriving from the other rail section 8 pile up, is arranged on the profile rail 7 after switch 75. The separating device 9 releases the retaining adapters 6 at predetermined intervals b, defined by the distance between two second tappets 54 of thrust chain links 5 interconnected by connection chain links 3, 4, for the gravity-assisted onward transport.

A corresponding retaining adapter 6 is now somewhere in the region between a front second tappet 54 of a thrust chain link 5 in the conveying direction x and a first tappet 53 of a rear thrust chain link of the conveyor chain 2 in a conveying direction x.

During the onward movement of the retaining adapter 6 in a horizontally extending region of the rail profile 7, one of the first tappets 53 of the conveyor chain 2 catches up with the head portions 61 of the retaining adapters 6 and pushes the head portions 61 into a coupling section of the rail profile 7, as shown in a detailed view in FIG. 5, where a head portion 61 of a respective retaining adapter 6 is received between the two tappets 53, 54 of a thrust chain link 5.

As shown in FIG. 5, the retaining adapters 6 are coupled in the coupling section of the rail profile 7 between the tappets 53, 54 of the thrust chain links 51. This coupling section of the rail profile 7 is hereby preferably formed as a localized depression 73 in relation to a main displacement plane 721 in the second track 72.

After insertion of the retaining adapter 6 in the region of the coupling section of the rail profile 7, the connection chain links 3, 4 of the conveyor chain 2 initially pass the head 61 of the retaining adapter 6. Once a thrust chain link 5 enters the coupling section, the front first tappet 53 of the thrust chain link 5 strikes the head portion 61 of the retaining adapter 6 and pushes the retaining adapter 6 in the conveying direction x into a localized depression 73 of the second track 72.

The depth of the depression 73 of the second track 72 is dimensioned so that the first shorter tappet 53 moves over the head portion 61 of the retaining adapter 6 just before reaching a local low point 733, so that the rear second tappet 54 strikes the retaining adapter 6 only in the conveying direction x and moves the retaining adapter 6 onward from the local low point 733 of the second track 72 via a raised portion 732 back into the main displacement plane 721 of the track 72.

Once the retaining adapter 6 reaches again the main plane 721 of the second track 72, the head portion 61 of the retaining adapter 6 is received between the two tappets 53, 54 of the thrust chain link 5 without play or at least substantially without play, thus allowing defined positioning of the retaining adapter 6 and thus of the article suspended on the conveyor chain 2, so that the articles suspended from the retaining adapters 6 can be reliably sorted during the onward conveyance along the rail section 7.

The rear second tappet 54 which pushes the retainer adapter 6 in the conveying direction when the conveyor chain 2 moves, is preferably T-shaped. In this case, a throat portion 541 of the T-shaped tappet 54 is formed narrower in a plane perpendicular to the conveying direction x than a flat cross piece 542 of the T-shaped tappet 54 aligned perpendicular to the throat portion 541, which is formed on an end of the throat portion 541 facing away from the bottom side 512 of the base body 51. The crosspiece 542 is here vertically aligned in relation to the longitudinal axis x of the base body or to the conveying direction. Also, the front tappet 53 has a flat stop surface oriented perpendicular to the conveying direction x.

Two chain links of the conveyor chain 2 formed as a thrust chain links 5 are preferably each spaced at a mutual distance d of between 200 and 300 mm between two second tappets 54 of thrust chain links 5 interconnected by connection chain links 3, 4, so as to, on the one hand, enabling a tight placement on the conveyor system and the conveyor chain and to allow, on the other hand, feeding and sorting of predetermined suspended articles on the retaining adapters 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A thrust chain link of a conveyor chain of a conveyor system for conveying articles suspended from retaining adapters, comprising:
   a base body having a thrust unit arranged on a bottom side of the base body and coupling sections formed on ends of the base body that are spaced-apart in a conveying direction for pivotal connection of the base body to an adjacent chain link, wherein the thrust unit comprises two tappets protruding from the bottom side of the base body, with a front first tappet in the conveying direction being shorter than a rear second tappet, wherein a spacing between the two tappets is dimensioned such that a head portion of a retaining adapter is received between the two tappets without play or largely without play.

2. The thrust chain link of claim 1, wherein the conveyor system is a sorter.

3. The thrust chain link of claim 1, wherein the tappets are formed as bars protruding perpendicularly from the bottom side of the base body.

4. The thrust chain link of claim 3, wherein at least one of the tappets is T-shaped, wherein a throat portion of the T-shaped tappet extends from the bottom side of the base body and a flat cross-piece of the T-shaped tappet is oriented perpendicular to the throat portion and is formed on an end of the throat portion facing away from the bottom side of the base body, wherein the cross-piece is aligned perpendicular to a longitudinal axis of the base body.

5. The thrust chain link of claim 1, wherein the base body comprises lateral pressure roller pressing faces in contact with friction rollers driving the conveyor chain, and a bearing disposed on a top side of the base body for supporting running rollers or guide rollers.

6. A conveyor chain of a conveyor system for conveying articles suspended from retaining adapters, comprising a plurality of chain links, each chain link having a base body and coupling sections disposed on ends of the base body that are spaced apart in a conveying direction, for pivotal connection of adjacent chain links, wherein a portion of the chain links is formed as thrust chain links comprising a thrust unit arranged on a bottom side of the base body, with the thrust unit comprising two tappets protruding from the bottom side of the base body, with a front first tappet in the conveying direction being shorter than a rear second tappet, wherein a spacing between the two tappets is dimensioned such that a head portion of a retaining adapter is received between the two tappets without play or largely without play, and wherein at least one chain link formed as a connection chain link is arranged between two thrust chain links.

7. The conveyor chain of claim 6, wherein the spacing between two tappets of thrust chain links that are interconnected by the connection chain link is between 200 mm and 300 mm.

8. The conveyor chain of claim 6, wherein the base body of the connection chain link comprises lateral pressure roller pressing faces in contact with friction rollers driving the conveyor chain, and a bearing disposed on a top side of the base body for supporting running rollers or guide rollers.

9. A conveyor system for conveying articles suspended from retaining adapters, the conveyor system comprising:
- a rail profile having tracks,
- a conveyor chain movable in a first track of the rail profile in a conveying direction and comprising a plurality of chain links having each a base body and a thrust unit arranged on a bottom side of the base body,
- wherein each retaining adapter has a head portion rollably supported in a second track of the rail profile,
- wherein each chain link comprises coupling sections disposed on ends of the base body that are spaced apart in a conveying direction, for pivotal connection of adjacent chain links, wherein a portion of the chain links is formed as thrust chain links comprising a thrust unit arranged on a bottom side of the base body, with the thrust unit comprising two tappets protruding from the bottom side of the base body, with a front first tappet in the conveying direction being shorter than a rear second tappet, wherein a spacing between the two tappets is dimensioned such that the head portion of a retaining adapter is received between the two tappets without play or largely without play, and wherein at least one chain link formed as a connection chain link is arranged between two thrust chain links,
- wherein the rail profile has a coupling section in which the retaining adapters can be coupled between the tappets of the thrust chain links, wherein the coupling section is formed in the second track as a localized depression relative to a main displacement plane, wherein a local low point in the depression is dimensioned relative to the main displacement plane so that the front first tappet of the thrust chain link proximate to the depression is out of engagement with the head portion of the respective retaining adapter.

10. A method for positioning a retaining adapter on a conveyor chain of a conveyor system, comprising:
a. Inserting the retaining adapter in a section of the conveyor chain between a second tappet of a front thrust chain link in a conveying direction and a first tappet of a rear thrust chain link in the conveying direction,
b. Carrying along the retaining adapter into a coupling section of a rail profile in the conveying direction with the first tappet of the rear thrust chain link that is arranged in the conveying direction before the second tappet,
c. Lowering the retaining adapter underneath the first tappet and advancing the retaining adapter in the conveying direction with the second tappet in the coupling section of the rail section, and
d. Raising the retaining adapter between the first tappet and the second tappet of the conveyor chain in the coupling section of the rail profile.

* * * * *